US012724757B2

(12) United States Patent
Lipskin

(10) Patent No.: US 12,724,757 B2
(45) Date of Patent: Sep. 1, 2026

(54) AUTHORITY BINDING SYSTEM AND COMPUTER-IMPLEMENTED METHOD FOR A DIGITAL DOCUMENT

(71) Applicant: The Mirror Project LLC, Boca Raton, FL (US)

(72) Inventor: Scott Lipskin, Boca Raton, FL (US)

(73) Assignee: The Mirror Project LLC, Boca Raton, FL (US)

( * ) Notice: Subject to any disclaimer, the term of this patent is extended or adjusted under 35 U.S.C. 154(b) by 0 days.

(21) Appl. No.: 19/540,609

(22) Filed: Feb. 14, 2026

(65) Prior Publication Data

US 2026/0187044 A1 Jul. 2, 2026

Related U.S. Application Data

(63) Continuation of application No. 19/534,902, filed on Feb. 10, 2026.

(51) Int. Cl.

*G06F 16/22* (2019.01)
*G06F 16/13* (2019.01)
*G06F 21/10* (2013.01)
*G06F 21/62* (2013.01)

(52) U.S. Cl.

CPC .............. *G06F 16/22* (2019.01); *G06F 16/13* (2019.01); *G06F 21/101* (2023.08); *G06F 21/6209* (2013.01); *G06F 2221/2137* (2013.01)

(58) Field of Classification Search

CPC ........ G06F 16/22; G06F 16/13; G06F 21/101; G06F 21/6209; G06F 2221/2137

See application file for complete search history.

(56) References Cited

U.S. PATENT DOCUMENTS 10,796,086 B2 10/2020 Lewbel
11,276,039 B2 3/2022 Venkatraman et al.
11,418,497 B2 8/2022 Rathore et al.
11,449,911 B2 9/2022 Fang et al.
11,687,495 B2 6/2023 Wylie et al.
12,166,858 B2 12/2024 Komandur et al.
(Continued)

FOREIGN PATENT DOCUMENTS

CN 103530099 A * 1/2014
IN 202521098632 A 10/2025
WO 2025253260 12/2025

*Primary Examiner* — William Spieler

(74) *Attorney, Agent, or Firm* — The Powers IP Law Firm

(57) ABSTRACT

An authority binding system for a digital document is provided. The system includes a document entity configured to represent the digital document as a canonical identity that persists across time; a temporal state model configured to receive the digital document from the document entity, receive a time output from a clock, and bind an authoritative state of the digital document to the time output such that the time output is part of a structural model of the digital document; an authority control layer configured to govern the authoritative state by a number of time-bound lifecycle state transitions of the digital document, a lifecycle state machine configured to structurally enforce the transitions of the digital document; a resolution engine configured to close a number of temporal windows of mutability of the digital document; and a temporal query interface configured to resolve requests to access the digital document.

17 Claims, 8 Drawing Sheets

(56) References Cited

U.S. PATENT DOCUMENTS

2019/0236124 A1 8/2019 Bumby et al.
2020/0082106 A1* 3/2020 Fox ....................... H04L 63/083
2024/0275790 A1 8/2024 Reddy et al.
2024/0370827 A1 11/2024 Zionpour et al.
2025/0173446 A1 5/2025 Hadi
2025/0291512 A1 9/2025 Gilchrist et al.

* cited by examiner

AUTHORITY BINDING SYSTEM AND COMPUTER-IMPLEMENTED METHOD FOR A DIGITAL DOCUMENT

CROSS REFERENCE TO RELATED APPLICATION

This application is a continuation patent application that claims priority to and claims the benefit of U.S. patent application Ser. No. 19/534,902, filed Feb. 10, 2026, the contents of which are incorporated herein by reference in their entirety.

BACKGROUND

Existing document systems (e.g., word processors, collaborative docs, PDFs, repositories) suffer from several structural limitations. First, documents often drift over time. Second, "versions" are often implemented as copies, forks, or snapshots. Third, historical references are often fragile and can be altered, deleted, or obscured. Fourth, users typically must trust process guarantees when determining what is true within a document. These limitations and others become critical in legal, financial, technical, contractual, and decision-making contexts.

It is with respect to these and other considerations that the instant disclosure is concerned.

SUMMARY

In one aspect of the disclosed concept, an authority binding system for a digital document is provided. The system comprises a document entity configured to represent the digital document as a canonical identity that persists across time; a temporal state model configured to receive the digital document from the document entity, receive a time output from a clock, and bind an authoritative state of the digital document to the time output such that the time output is part of a structural model of the digital document; an authority control layer configured to govern the authoritative state by a number of time-bound lifecycle state transitions of the digital document; a lifecycle state machine configured to structurally enforce the number of time-bound lifecycle state transitions of the digital document; a resolution engine configured to close a number of temporal windows of mutability of the digital document in order to execute the number of time-bound lifecycle state transitions; and a temporal query interface configured to resolve requests to access the digital document when the number of temporal windows of mutability of the digital document are closed by the resolution engine.

In another aspect, an authority binding computer-implemented method for a digital document is provided. The method comprises representing the digital document with a document entity as a canonical identity that persists across time; receiving both the digital document from the document entity and a time output from a clock with a temporal state model; binding an authoritative state of the digital document to the time output such that the time output is part of a structural model of the digital document; governing the authoritative state with an authority control layer by a number of time-bound lifecycle state transitions of the digital document; structurally enforcing the number of time-bound lifecycle state transitions of the digital document with a lifecycle state machine; closing a number of temporal windows of mutability of the digital document with a resolution engine in order to execute the number of time-bound lifecycle state transitions; and resolving requests to access the digital document with a temporal query interface when the number of temporal windows of mutability of the digital document are closed by the resolution engine.

DETAILED DESCRIPTION

In the following description, for the purposes of explanation, numerous specific details are set forth in order to provide a thorough understanding of various embodiments of the invention. As used herein, "embodiments" are non-limiting examples of apparatuses or methods employing one or more of the inventive concepts disclosed herein. It is apparent, however, that various embodiments may be practiced without these specific details or with one or more equivalent arrangements. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features of the various embodiments may be otherwise combined, separated, interchanged, and/or rearranged without departing from the inventive concepts.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "may include," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, may be used as terms of approximation and not as terms of degree, and, as such, are utilized to account for inherent deviations in measured, calculated, and/or provided values that would be recognized by one of ordinary skill in the art.

As employed herein, the term "number" shall mean one or an integer greater than one (i.e., a plurality).

As employed herein, the phrase "malleable representation of a digital document" shall mean a representation of a digital document that is in a malleable state corresponding to the digital document being modifiable (e.g., without limitation, editable).

As employed herein, the phrase "fixed representation of a digital document" shall mean a representation of a digital document that is in a fixed state corresponding to the digital document being preserved at a specific moment in time.

As employed herein, the phrase "absolute representation of a digital document" shall mean a representation of a digital document that is in an absolute state corresponding to the digital document being permanently finalized.

Figure 1:
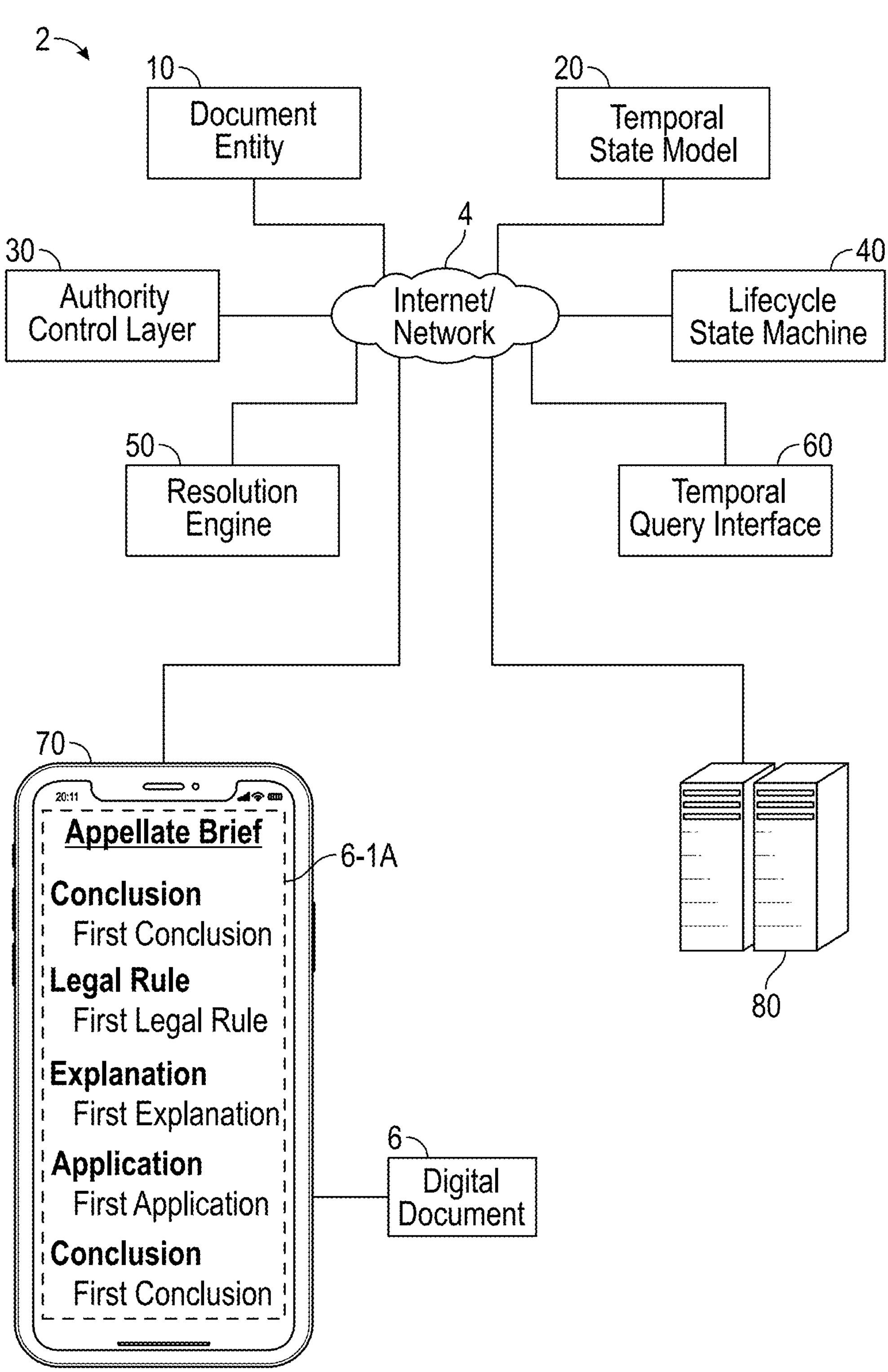
FIG. 1 is a schematic view of an authority binding system for a digital document, shown as employed with the digital document in simplified form, in accordance with one non-limiting embodiment of the disclosed concept.

FIG. 1 shows a schematic view of an authority binding system 2 for a digital document 6, in accordance with one non-limiting embodiment of the disclosed concept. As shown, the system 2 may include a document entity 10, a temporal state model 20, an authority control layer 30, a lifecycle state machine 40, a resolution engine 50, and a temporal query interface 60, each of which may be configured to communicate over an internet/network 4. The system 2 is also shown in FIG. 1 as employed with a user device 70 and a backend server 80, each of which may be configured to communicate with the other elements 10,20,30,40,50,60 of the system 2 over the internet/network 4. Moreover, in FIG. 1 the user device 70 is displaying a first malleable representation 6-1A of the digital document 6.

As will be discussed in greater detail below, the system 2 may be configured to create, maintain, and present the digital document 6, whose authoritative state may be explicitly bound to time and controlled authority, rather than to mutable versions, duplicated copies, or collaborative edit histories. In order to perform these functions, the system 2 may be configured such that time may be a first-class, enforceable primitive of the digital document 6 itself.

In accordance with the disclosed concept, at any moment the digital document 6 may have a single authoritative current state, and a set of authoritative historical states that can be referenced, viewed, or verified without copying or branching. Unlike traditional documents, the digital document 6 being employed by the system 2 may not rely on version duplication, manual saving, forks, or informal edit histories to establish truth or authority. Instead, the digital document 6 may have a state that is addressable and verifiable by time.

Figure 2:
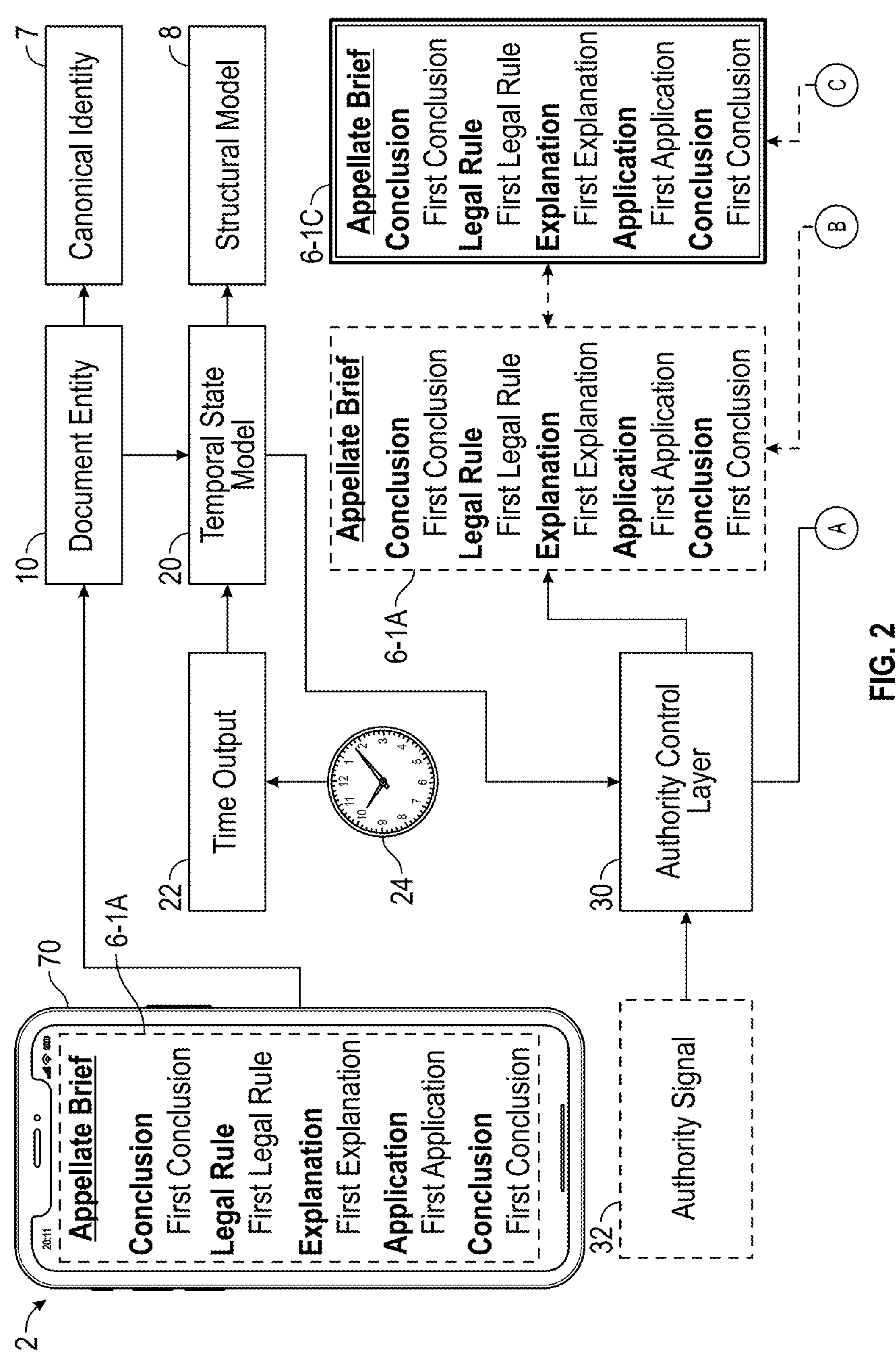
FIG. 2 is a flow view of the authority binding system of FIG. 1, shown as employed with other aspects in simplified form, in accordance with one non-limiting embodiment of the disclosed concept.
Figure 2:
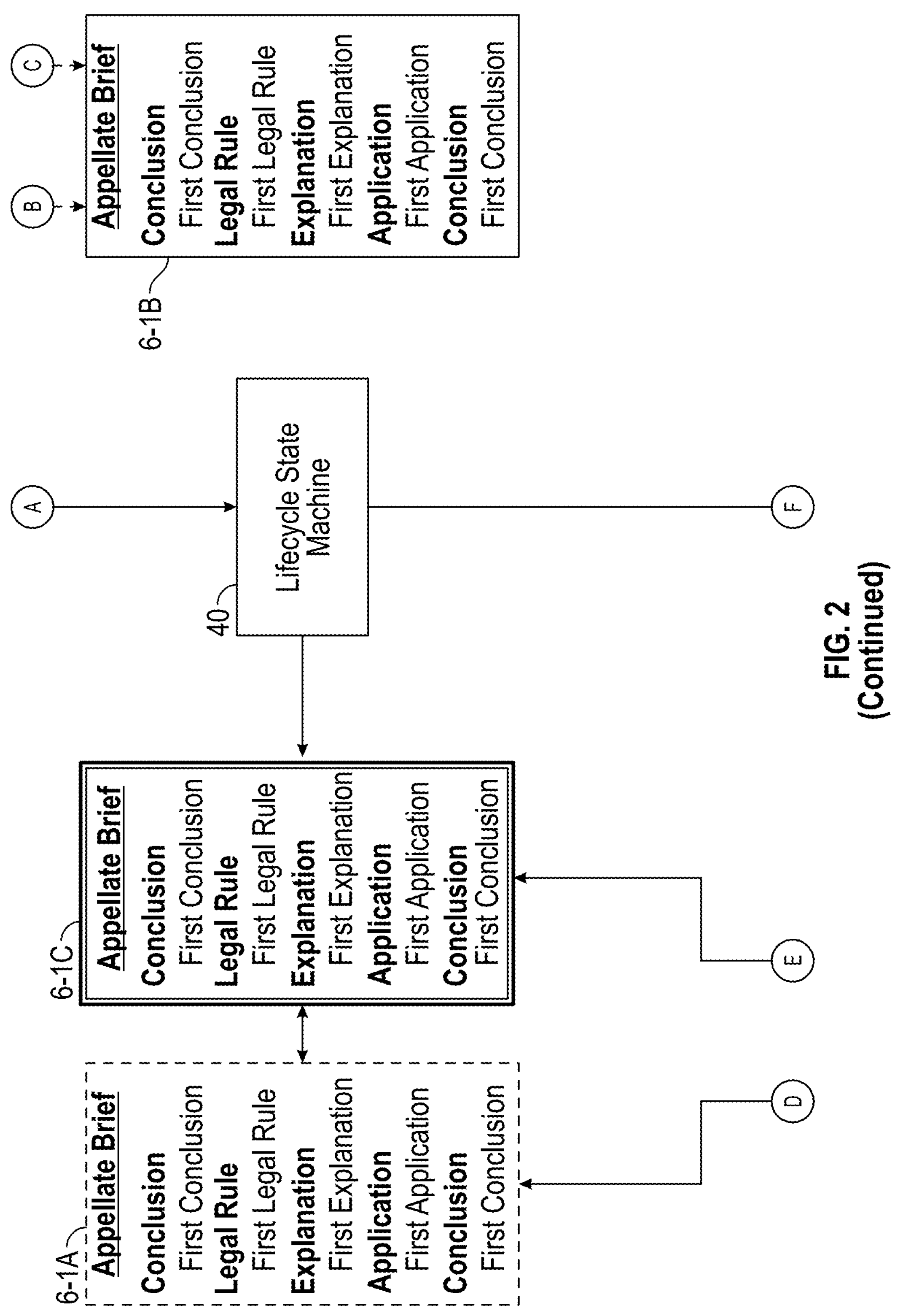
Figure 2:
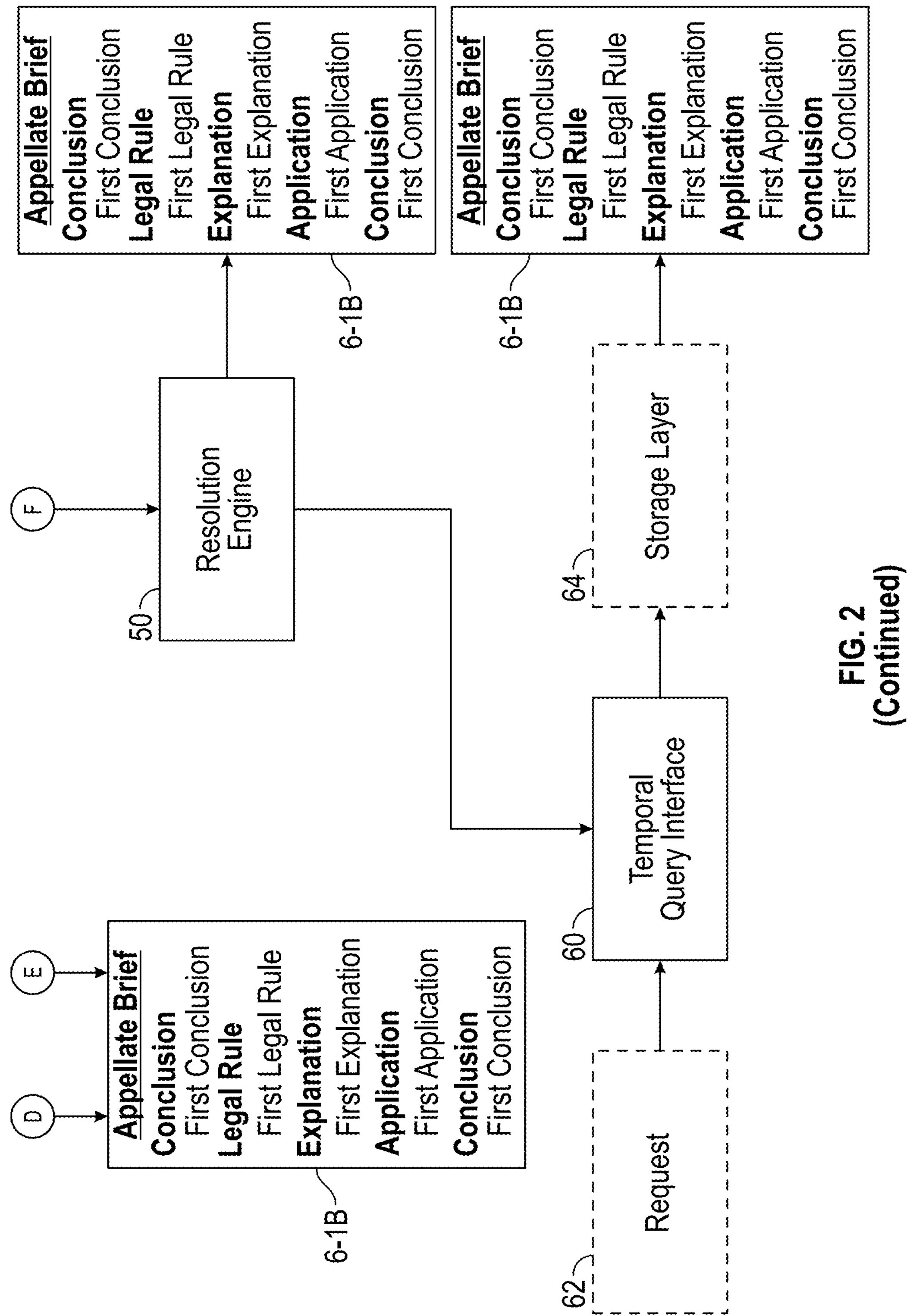

FIG. 2 shows another view of the system 2. As shown, the document entity 10 may be configured to represent the digital document 6 as a canonical identity 7 that persists across time, and the temporal state model 20 may be configured to receive the digital document 6 from the document entity 10, receive a time output 22 from a clock 24 (e.g., without limitation, any system-provided or external time source capable of producing the time output 22, including a system clock, an operating-system clock, a network-synchronized clock, and/or another reliable time source), and bind an authoritative state of the digital document 6 to the time output 22 such that the time output 22 may be part of a structural model 8 of the digital document 6. In accordance with embodiments of the disclosed concept, the temporal state model 20 may generate time coordinates from the time output 22 and bind the authoritative state of the digital document 6 to the time output 22 upon closure of a temporal window of mutability by the resolution engine 50. This binding may incorporate the time output 22 and time coordinates directly into the structural model of the digital document 6 rather than as metadata or annotations layered thereon.

By stating that the time output 22 may be part of the structural model 8 of the digital document 6, corresponding time coordinates 23 (FIG. 5) generated from the time output 22 may not merely be metadata, a label, or an annotation. Instead, the time output 22 may be incorporated into a lifecycle structure of the digital document 6 such that authoritative state transitions may be indexed, bounded, and resolved using the time output 22. Moreover, access to authoritative document content may be deterministically resolved by reference to the time output 22. In other words, the time output 22 may participate directly in how the system 2 defines, enforces, and retrieves authoritative document states. It will also be appreciated that the document entity 10 may be further configured to represent the digital document 6 as a multi-author digital document having the authoritative state at any moment in time. Moreover, the temporal state model 20 may be further configured to bind the authoritative state of the digital document 6 to the time output 22 without layering an annotation on top of the digital document 6.

Furthermore, the authority control layer 30 may be configured to govern the authoritative state by a number of time-bound lifecycle state transitions of the digital document 6. In this regard, in one example only verified authority events may trigger lifecycle state transitions (e.g., freeze, unfreeze, seal). The lifecycle state machine 40 may also be configured to structurally enforce the number of time-bound lifecycle state transitions of the digital document 6. To illustrate, FIG. 2 depicts the first malleable representation 6-1 of the digital document 6, as well as a first fixed representation 6-1B of the digital document and a first absolute representation 6-1C of the digital document 6, shown as being governable by the authority control layer 30 via dashed transition lines, and being structurally enforceable by the lifecycle state machine 40 via solid transition lines.

Continuing to refer to FIG. 2, the resolution engine 50 may be configured to close a number of temporal windows of mutability of the digital document 6 in order to execute the number of time-bound lifecycle state transitions. In this regard, finality may be intentional, attributable, time-bound, and system-enforced rather than socially inferred.

Furthermore, the temporal query interface 60 may be configured to resolve requests to access the digital document 6 when the number of temporal windows of mutability of the digital document 6 are closed by the resolution engine 50. See, for example, a transition to the first fixed representation 6-1B of the digital document 6 having been executed by the resolution engine 50. Additionally, the temporal query interface 60 is shown in FIG. 2 in association with a storage layer 64 to denote that the system 2 may support persistent state representation.

Accordingly, the document entity 10 may provide a single canonical anchor for the system 2, the temporal state model 20 may bind document truth to the time output 22, the authority control layer 30 may govern when lifecycle transitions may occur, the lifecycle state machine 40 may enforce those transitions structurally, the resolution engine 50 may close temporal windows of mutability, and the temporal query interface 60 may deterministically resolve truth at any point in time. Truth in this regard may be an emergent property resulting from the canonical identity 7, a singular authoritative state at any moment in time, a number of authority-bound lifecycle transitions, a structural enforcement of mutability termination, and/or a deterministic temporal retrieval.

Each of the elements 10,20,30,40,50,60 of the system 2 may thus operate independently but together correspond to the system 2 being a unified system that enforces a single authoritative document state at any moment. In accordance with the disclosed concept, the time output 22 may be incorporated into the structural model 8 of the digital document 6, not merely recorded as metadata, timestamps, audit logs, or version history. Furthermore, authoritative state may be defined by time-bound lifecycle transitions, not by retrieving stored copies, reconstructing versions, or relying on external process. Additionally, finality in the system 2 may be optional and intentional such that the digital document 6 may remain editable indefinitely unless and until an authorized authority event explicitly terminates mutability.

More specifically, the document entity 10 may function to maintain the canonical identity 7 of the digital document 6 throughout its lifecycle and across all state transitions. In this regard, the canonical identity 7 may serve as a primary object operated on by the temporal state model 20, the authority control layer 30, the lifecycle state machine 40, the resolution engine 50, and the temporal query interface 60. All authoritative states may thus, in one example, be associated with the canonical identity 7.

Moreover, the temporal state model 20 may maintain the authoritative historical state lineage, receive transition signals from the lifecycle state machine 40 and the resolution engine 50, and provide authoritative state mapping used by the temporal query interface 60 to deterministically resolve document content at a specified time. Furthermore, the authority control layer 30 may verify and validate authority signals that permit lifecycle state transitions. Authority may be evaluated independently of participation, access permissions, or workflow roles. In terms of interoperability, the authority control layer 30 may signal the lifecycle state machine 40 and the resolution engine 50 when authorized lifecycle transition events occur, including freeze, unfreeze, and sealing events. Also, the lifecycle state machine 40 may define and enforce valid lifecycle states and permissible transitions between them, and may prevent unauthorized or invalid lifecycle transitions. In terms of interoperability, the lifecycle state machine 40 may receive authority validation signals from the authority control layer 30, may control transition events executed by the resolution engine 50, and may govern document mutability state enforcement. The resolution engine 50 may operate as the actuator of lifecycle transitions, work under enforcement rules defined by the lifecycle state machine 40 and the authority control layer 30, and signal the temporal state model 20 to record authoritative state boundaries and provide boundary markers used by the temporal query interface 60. Additionally, the temporal query interface 60 may allow retrieval of authoritative document content at a specific time without requiring version duplication or branching, and may query the temporal state model 20 and authoritative state lineages to resolve access requests.

In accordance with the disclosed concept, the digital document 6 may have a single authoritative state at any given moment, and historical states of the digital document 6 may be immutable once passed. Furthermore, authority to modify, freeze, or unlock the digital document 6 may be explicitly governed by the authority control layer 30. In this regard, the time output 22 may not be metadata, but instead may be part of the structural model 8 of the digital document 6. As a result, the digital document 6 may be referenced by timestamp, viewing a past state may not create a copy of the digital document 6, and historical states of the digital document 6 may be retroactively altered.

It will also be appreciated that one or more authorized parties may have permission to modify the digital document 6, and authority may include the ability to edit, freeze (e.g., without limitation, lock), unfreeze, or permanently seal a document. Moreover, authority rules may be enforced by the system 2, as opposed to social convention. Accordingly, the disclosed system 2 may thus replace reliance on organizational policies, user agreements, workflow completion signals, and/or interface-based status indicators, and instead provide for system-enforced lifecycle transitions that mechanically terminate mutability. Additionally, the system 2 may be configured such that the digital document 6 may be frozen at a specific moment, and once frozen, the digital document 6 may become immutable. Freeze events in this regard may be temporary, conditional, or permanent, and freeze authority may be unilateral or multi-party.

It will also be appreciated that the digital document 6 may always be accessed via the same surface (e.g., URL, identifier), and the system 2 may determine which state may be presented based on time and authority. Beneficially, the system 2 may be configured such that there may be no divergent "copies" representing the same document. Furthermore, if editing resumes after a freeze (where permitted), the system 2 may clearly delineate the frozen state, and subsequent states. A lineage of the digital document 6 may thus remain continuous and non-forking.

The system 2 may thus be distinct from known systems (not shown) in that the system 2 may not provide for traditional version control, collaborative documents with edit history, static documents with revisions, or databases with record timestamps. That is, the system 2 may not provide for branching or parallel truths, or reliance on version copies, but may instead provide for explicit authority enforcement, and time as a governing dimension.

The system 2 may thus be particularly suitable for legal agreements whose authoritative language must be referenced as of a specific date, for technical specifications that evolve but require immutable historical states, for investment materials that must show what was known when decisions were made, for policies or disclosures where retroactive modification is prohibited, as well as any context where "what did this say at that time?" must have a definitive answer.

Regarding implementation of the system 2, the digital document 6 may be implemented as a unique addressable entity (e.g., domain, identifier, resource), state transitions (e.g., without limitation, between the malleable, fixed, and absolute states) may be system-mediated, historical states may be preserved without duplication, and presentation may resemble a document, a web page, or another readable surface. The system 2 may thus be configured to be agnostic to storage, user interface (UI), and transport mechanisms, with an example advantage being that time and authority may be enforceable primitives of an existence of the digital document 6, rather than as annotations layered on top of mutable files. As a result, the system 2 may be configured for time-addressable document state, authority-enforced document mutability, freeze and lock mechanisms tied to document state, and presentation of authoritative historical states without duplication.

Figure 3:
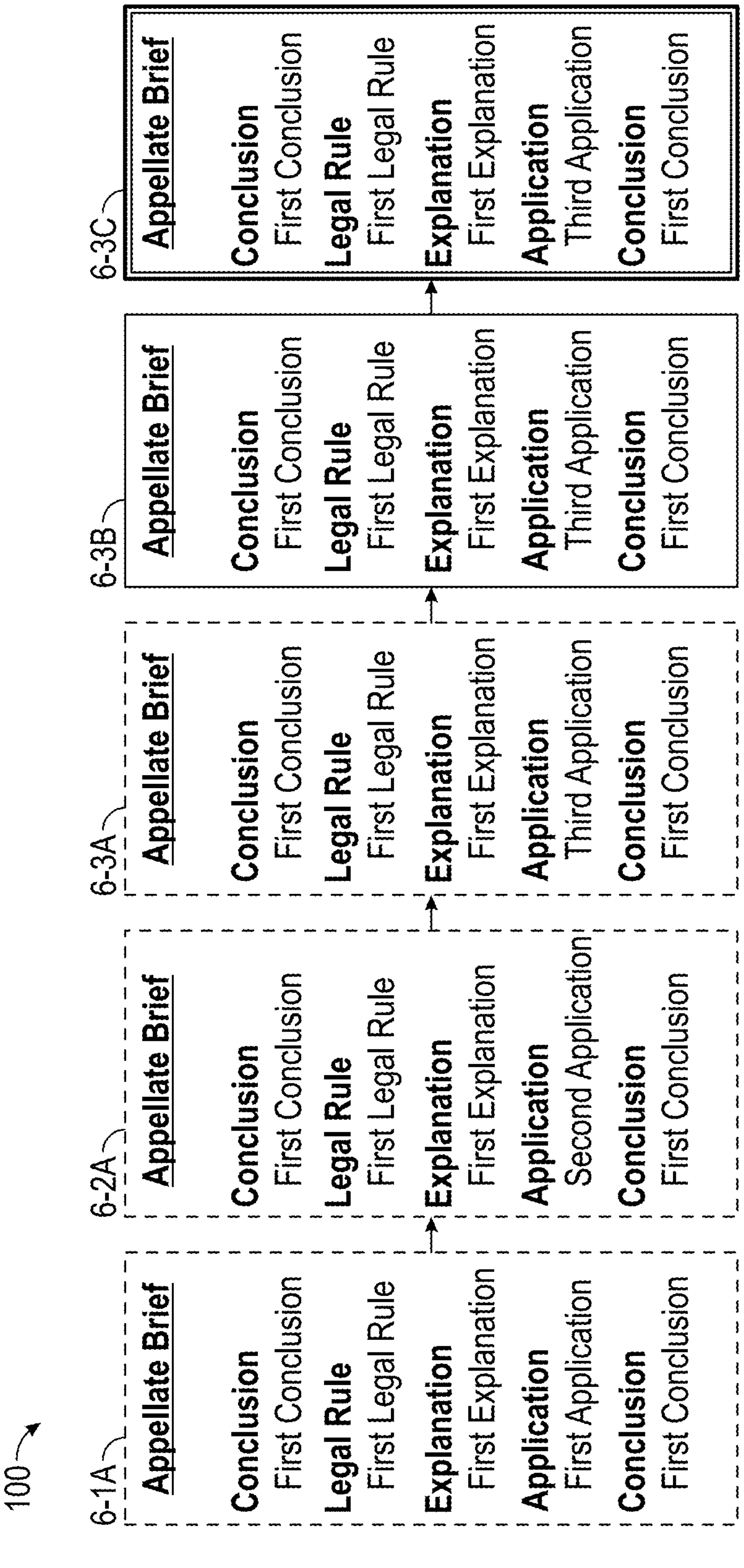
FIG. 3 is a flow chart corresponding to lifecycle transitions of the digital document, in accordance with one non-limiting embodiment of the disclosed concept.

FIG. 3 shows a flow chart 100 corresponding to lifecycle transitions of the digital document 6, in accordance with one non-limiting embodiment of the disclosed concept. More specifically, FIG. 3 shows first, second, and third malleable representations 6-1A,6-2A,6-3A of the digital document 6, which may correspond to one user or multiple users having made edits to the digital document 6 (e.g., the first, second, and third malleable representations 6-1A,6-2A,6-3A are all different from one another). Additionally, FIG. 3 also depicts two time-bound lifecycle state transitions of the digital document 6, first as a transition from the third malleable representation 6-3A to a third fixed representation 6-3B, and second from the third fixed representation 6-3B to a third absolute representation 6-3C.

Accordingly, it will be appreciated that the lifecycle states (malleable, fixed, absolute) may describe the mutability conditions under which the digital document 6 exists, while the aforementioned authoritative state may be the single document state that may be designated as authoritative at a given time coordinate. In one example, the number of time-bound lifecycle state transitions of the digital document 6 may include transitions between a malleable state corresponding to the digital document 6 being modifiable (e.g., without limitation, editable), a fixed state corresponding to the digital document 6 being preserved at a specific moment in time, and an absolute state corresponding to the digital document 6 being permanently finalized.

More specifically, in the malleable state, the authoritative state may be provisional and may change over time as edits occur. Furthermore, when a fixed state is entered, the authoritative state at that time coordinate may be preserved as an authoritative temporal boundary. Likewise, when the absolute state is entered, the authoritative state at that time coordinate may become permanently authoritative, and no further authoritative states may be created for the digital document 6. In short, the lifecycle states (e.g., malleable, fixed, absolute) may govern whether and how the authoritative state may change, while the authoritative state may be what the system 2 returns as truth when queried at a specific time. As such, the lifecycle states (e.g., malleable, fixed, absolute) may explain when binding may occur, when it may be suspended, and when it may be permanently closed, but they may not replace the authoritative state, but instead control its evolution. In one example, authoritative document truth may be established in the system 2 by structural lifecycle state transitions rather than by descriptive metadata, stored version histories, or workflow completion signals. The system 2 may thus mechanically enforce authoritative state boundaries through enforcement of the lifecycle state machine 40 and execution of the resolution engine 50.

In one example, the temporal state model 20 may be further configured to bind the authoritative state such that the authoritative state may be a single authoritative state of the digital document 6 at any moment in time, and/or such that the time output 22 is not metadata. It will also be appreciated that the temporal state model 20 may be further configured to index the authoritative state by a number of time coordinates without binding the authoritative state by at least one of, or any of, a number of version numbers of the digital document 6, a number of copies of the digital document 6, and a number of parallel authoritative document lineage branches (e.g., forks) derived from the canonical identity 7.

Indexing an authoritative state in this regard may refer to associating a document state with a temporal coordinate such that authoritative document content may be retrievable using time reference rather than version identifiers, stored copies, or manual edit histories. Furthermore, the lifecycle state machine 40 may be further configured to structurally enforce the number of time-bound lifecycle state transitions of the digital document 6 without employing at least one of, or each of, a permission change mechanism, a user interface lock mechanism, and a workflow label mechanism.

Referring again to FIG. 2, the number of time-bound lifecycle state transitions may be configured to be triggered in the lifecycle state machine 40 in response to the authority control layer 30 receiving an authority signal 32, and independent of an editing action with respect to the digital document 6. Additionally, the resolution engine 50 may be further configured to close the number of temporal windows of mutability of the digital document 6 upon receipt of the authority signal 32 at the authority control layer 30.

In one example, the closing of temporal windows by the resolution engine 50 may be the operational mechanism that executes lifecycle state transitions authorized by the authority control layer 30 and enforced by the lifecycle state machine 40. When the temporal windows close, the temporal state model 20 may record the authoritative boundary, the lifecycle state machine 40 may enforce mutability termination, and the temporal query interface 60 may use these boundaries to resolve authoritative document states. This may create a closed control loop linking authority validation, lifecycle enforcement, state boundary creation, and authoritative state retrieval. As such, each of the elements 10,20,30,40,50,60 may function together to provide the system 2 as being a closed-loop control system governing document mutability, authority enforcement, lifecycle transitions, and temporal truth verification.

Figure 4:
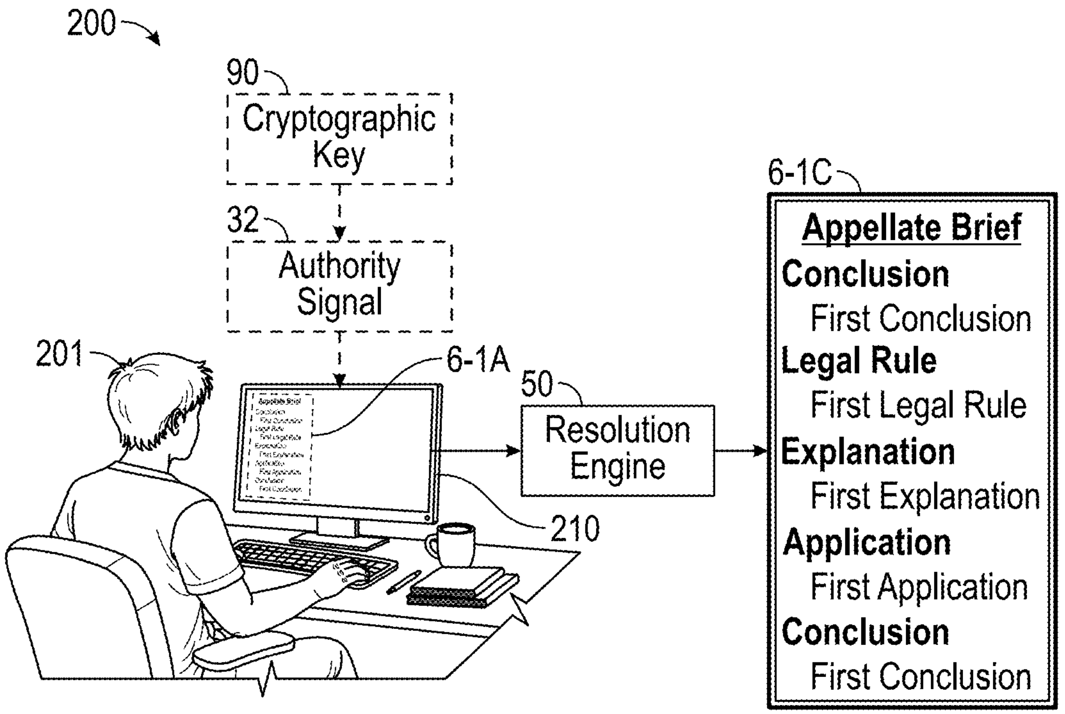
FIG. 4 is a workspace environment for the digital document, showing multi-party interaction versus authority separation, in accordance with one non-limiting embodiment of the disclosed concept.
Figure 4:
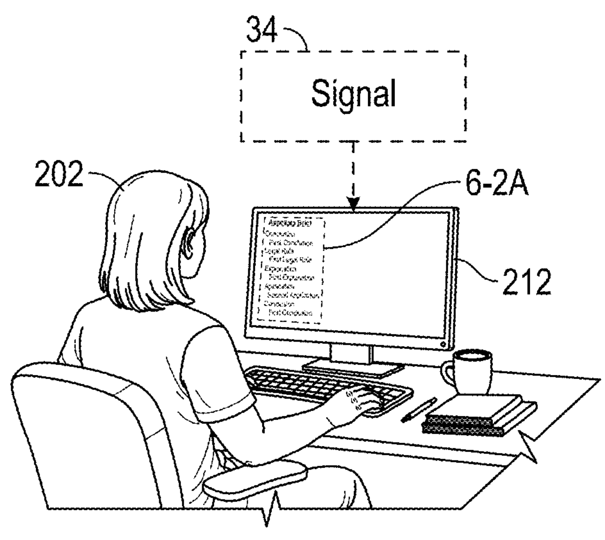

FIG. 4 shows a workspace environment 200 showing multi-party interaction with respect to the digital document 6 versus authority separation with respect to the digital document 6. More specifically, FIG. 4 shows a first author 201 and a second, different author 202 each interacting with (e.g., without limitation, editing) the digital document 6 on a corresponding user device (e.g., first computer 210 and second computer 212). As shown, the first computer 210 is depicting the first malleable representation 6-1A of the digital document 6 and the second computer 212 is depicting the second malleable representation 6-2A of the digital document.

In one example, the first author 201 may be configured to close a temporal window of mutability of the digital document 6, and the second author 202 may not. As stated above, the document entity 10 may represent the digital document 6 as a multi-author digital document having the authoritative state at any moment in time. The system 2 may also be configured to receive a plurality of interactions with respect to the digital document 6 from each of the first author 201 and the second author 202, and determine to close the temporal windows of mutability of the digital document 6 responsive to receiving the authority signal 32 at the authority control layer 30 from the first author 201, and to not close the number of temporal windows of mutability of the digital document 6 responsive to receiving another signal 34 at the authority control layer 30 from the second author 202 because the first author 201 is an authorized authority and the second author 202 is not. This is depicted in FIG. 4 via the first author 201 causing the authority signal to be received at the authority control layer 30, which in turn causes the resolution engine 50 to close the temporal windows of mutability of the digital document 6. See, for example, the first malleable representation 6-1A transitioning to the first absolute representation 6-1C. Accordingly, in one example only a verified authority signal (e.g., the authority signal 32) may cause the resolution engine 50 to close a temporal window of mutability. An unauthorized signal (e.g., the signal 34) may not trigger a state transition, even though the sender may otherwise be a participant to interaction with the digital document 6.

As such, the resolution engine 50 may be configured to close the temporal windows of mutability of the digital document 6 responsive to at least one authorized party (e.g., the first author 201) executing a state transition of the digital document 6. Beneficially, the resolution engine 50 may be configured to close the temporal windows of mutability of the digital document 6 without reliance on at least one of, or each of, an organizational policy, a user agreement, a workflow completion signal, and an interface-based status indicator. FIG. 4 thus illustrates an authority verification and transition process provided for by the system 2 in which the authority signal 32 is received, the authority control layer 30 verifies authorization, the lifecycle state machine 40 validates allowable transition, the resolution engine 50 closes a mutability window, the temporal state model 20 binds authoritative state to the time output 22, and the temporal query interface 60 updates authoritative retrieval index.

Figure 5:
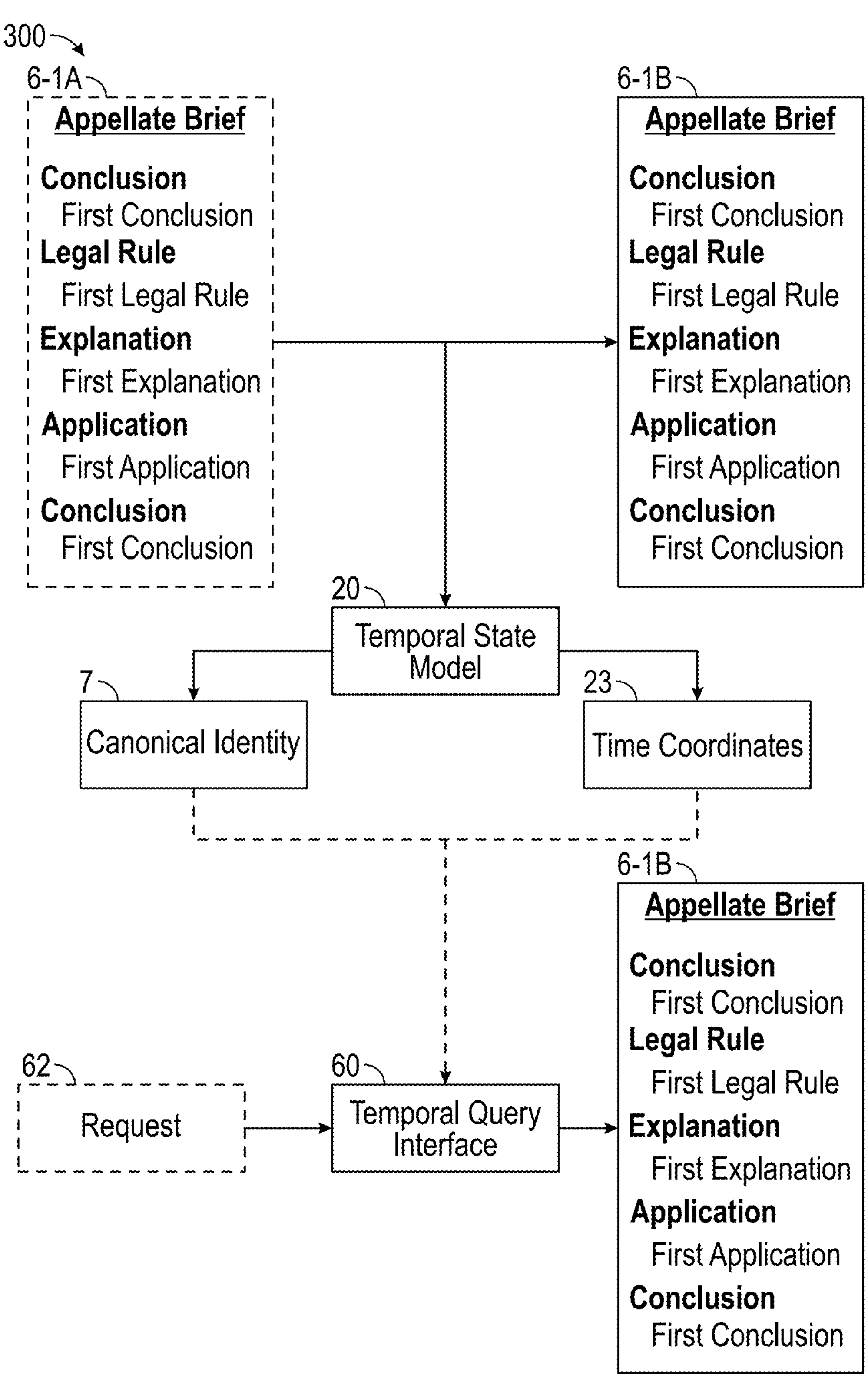
FIG. 5 shows a deterministic retrieval process for the digital document which is provided for by portions of the system of FIGS. 1 and 2, in accordance with one non-limiting embodiment of the disclosed concept.

FIG. 5 shows a deterministic retrieval process 300 for the digital document 6 provided for by portions of the system 2. As shown, the first malleable representation 6-1A of the digital document 6 has transitioned to the first fixed representation 6-1B. In this manner, the temporal state model 20 may be further configured to generate a number of time coordinates 23 from the time output 22, and the temporal query interface 60 may be further configured to resolve a request 62 to access the digital document 6 by employing the time coordinates 23. The time coordinates 23 may be generated during lifecycle transitions and authority events, may serve as structural state markers that define authoritative document boundaries, and may be normalized or generated from the time output 22. In one example, the time coordinates 23 may not be a version label or copy reference, but instead may be a temporal index into a single canonical document lineage.

For example, the canonical identity 7 and the time coordinates 23 may be input into the temporal query interface 60, and in response, the temporal query interface 60 may output an authoritative document state existing at a moment in time immediately after the transition from the malleable state to the fixed state. Note the transition from the first malleable representation 6-1A to the first fixed representation 6-1B at the top of FIG. 5, and in response, the first fixed representation 6-1B provided for by the temporal query interface 60. Accordingly, the temporal query interface 60 may return the authoritative document state that existed at the specified time without duplication, reconstruction, or branching. FIG. 5 thus illustrates that the system 2 contemplates non-duplication retrieval and canonical lineage enforcement.

Figure 6:
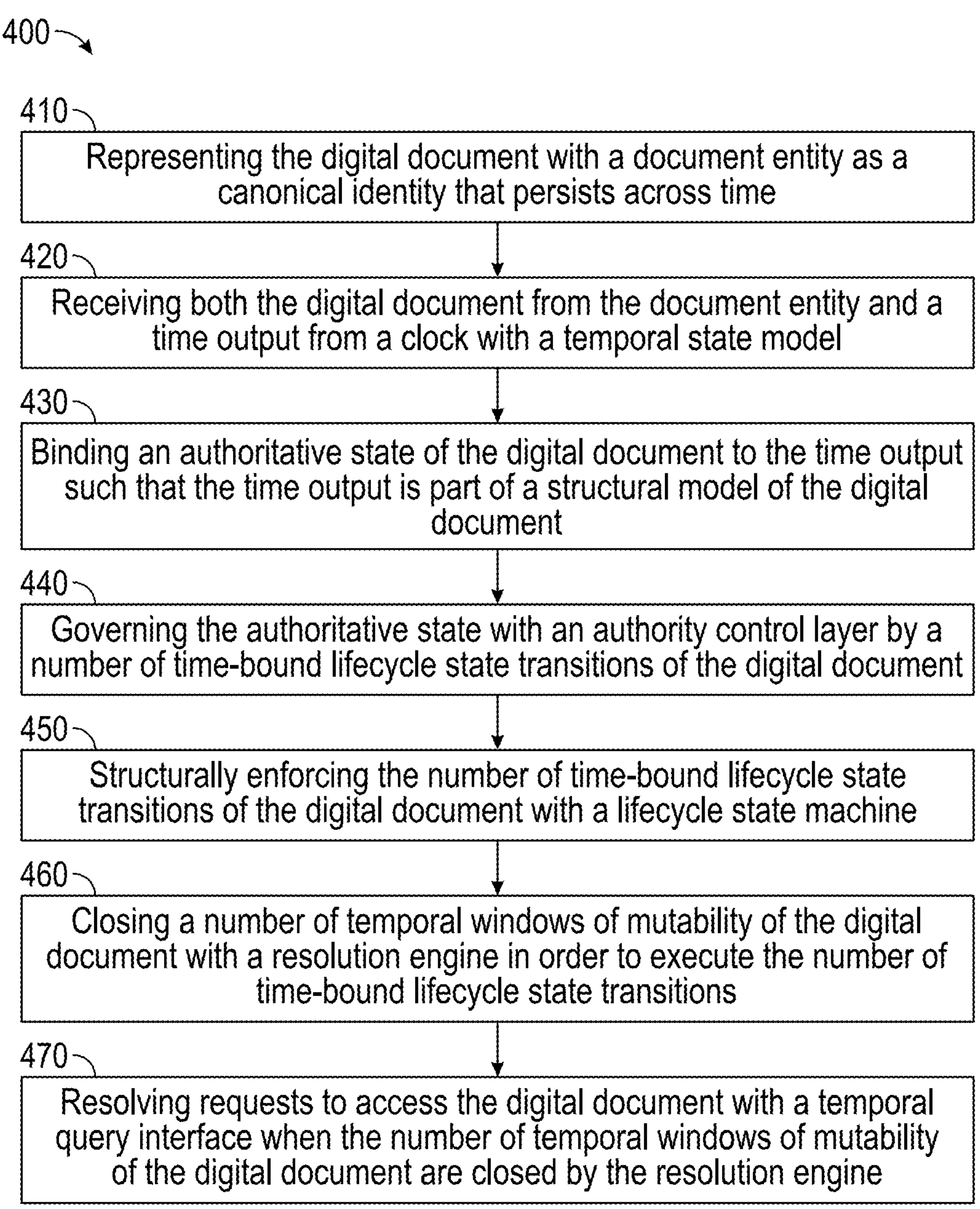
FIG. 6 shows a flow chart of an authority binding computer-implemented method for the digital document, in accordance with one non-limiting embodiment of the disclosed concept.

FIG. 6 shows a flow chart corresponding to an authority binding computer-implemented method 400 for a digital document. In one example, the method 400 comprises a first step 410 of representing the digital document 6 with a document entity 10 as a canonical identity 7 that persists across time; a second step 420 of receiving both the digital document 6 from the document entity 10 and a time output 22 from a clock 24 with a temporal state model 20; a third step 430 of binding an authoritative state of the digital document 6 to the time output 22 such that the time output 22 is part of a structural model 8 of the digital document 6; a fourth step 440 of governing the authoritative state with an authority control layer 30 by a number of time-bound lifecycle state transitions of the digital document 6; a fifth step 450 of structurally enforcing the number of time-bound lifecycle state transitions of the digital document 6 with a lifecycle state machine 40; a sixth step 460 of closing a number of temporal windows of mutability of the digital document 6 with a resolution engine 50 in order to execute the number of time-bound lifecycle state transitions; and a seventh step 470 of resolving requests to access the digital document 6 with a temporal query interface 60 when the number of temporal windows of mutability of the digital document 6 are closed by the resolution engine 50.

In one example, the third step 430 may be performed without auxiliary data being a governing dimension of the digital document 6. Moreover, the method 400 may further include a step of constantly providing the authoritative state to the digital document 6 after binding the authoritative state of the digital document 6 to the time output 22 with the temporal state model 20, as well as a step of providing the number of time-bound lifecycle state transitions of the digital document 6 as transitions between a malleable state corresponding to the digital document 6 being modifiable, a fixed state corresponding to the digital 6 being preserved at a specific moment in time, and an absolute state corresponding to the digital document 6 being permanently finalized. It will also be appreciated that the method 400 may further include a step of receiving an authority signal 32 at the authority control layer 30, and a step of triggering the number of time-bound lifecycle state transitions in the lifecycle state machine 40 in response to the authority control layer 30 receiving the authority signal 32, and independent of an editing action with respect to the digital document 6.

In this regard, the method 400 may further include a step of sending the authority signal 32 to the authority control layer 30 from an authorized cryptographic key 90 in order to cause the resolution engine 50 to close the number of temporal windows of mutability of the digital document 6. The method 400 may also further include a step of indexing the authoritative state with the temporal state model 20 by a number of time coordinates 23 without binding the authoritative state by at least one of, or all of, a number of version numbers of the digital document 6, a number of copies of the digital document 6, and a number of parallel authoritative document lineage branches derived from the canonical identity 7. Furthermore, it will be appreciated that the method 400 may also include steps corresponding to any of the functionality of the system 2, discussed above. It will also be appreciated that the user devices 70,210,212 disclosed herein may each include a corresponding processor and a corresponding memory having instructions that, when executed by the processor, cause the processor to perform the method 400.

Accordingly, the disclosed system 2 and method 400 may advantageously provide a temporal anchoring and sequencing mechanism that records when authoritative states occur, and may also ensure that downstream systems do not treat time-dependent events as interchangeable or retroactively mutable. The disclosed system 2 and method 400 may therefore not be a scheduler or logging system in the conventional sense, but instead may have as a function the binding of authority to time.

In one example, when a system other than the system 2 fixes agreed constraints into an authoritative, machine-enforceable form, the system 2 may record the moment of imprint. It will be appreciated that this timestamp may not merely be metadata, but instead the timestamp may become part of the authoritative context of the rule. In this regard, downstream systems may reference not just what rule was imprinted, but when such a rule became authoritative. In effect a rule may not be valid "in the abstract", but may instead be valid from a specific point in time forward.

Additionally, other systems besides the system 2 may include or reference an entry of the digital document 6, which may indicate a time of imprint, a version boundary, and/or a sequence position relative to other rules or actions. As a result, later components may be prevented from treating older rules as if they were contemporaneous with newer ones.

Furthermore, it will also be appreciated that other systems besides the system 2 may freeze content of a rule, and the system 2 may freeze a temporal boundary of that rule. Together, such a system may prevent retroactive reinterpretation, backdating of authority, and/or substitution of "earlier" or "later" rules to justify actions. In this regard, a combined system in accordance with the disclosed concept may include other systems that answer the question "what cannot change," in addition to the system 2 which may answer the question "when that 'what' became binding."

Moreover, the system 2 may also be employed in combination with another system that presents actions for evaluation alongside a locked rule artifact. In this regard, the system 2 may provide a reference indicating when the rule became authoritative. This may ensure that an agent cannot cite a rule that did not yet exist, rely on a rule that was superseded, and/or collapse temporal ordering into a single abstract policy state. Such behavior may be inherently agentic, because the agent's action proposal may be evaluated in a temporal context, not just a logical one.

Moreover, the system 2 may also be employed in combination with another system that performs binary enforcement (allow and block). In this regard, the system 2 may function to allow the gate to evaluate whether the proposed action is temporally valid and/or whether the rule being cited was authoritative at the time of action. Doing so may advantageously prevent "after-the-fact justification" or post hoc rule alignment.

Accordingly, it will be appreciated that the system 2 may not be a passive storage, but may instead actively participate in action evaluation by constraining which rules are eligible for enforcement, enforcing ordering between agreement, authority, and execution, and preventing agents from operating outside a coherent temporal frame. In other words, an agent may not be permitted to act unless a rule existed, unless a rule was imprinted before the action, unless a rule remained locked, and unless a rule was temporally applicable. As a result, the system 2 may be placed squarely in the agentic enforcement chain, not as infrastructure but as a control primitive.

It will also be appreciated that a core aspect of the system 2 may be intentional finality enforced by authority, meaning that an authorized party (or parties) may explicitly freeze or permanently seal a document state, at which point mutability may be structurally terminated by the system 2 rather than socially or procedurally. In other words, the system 2 may support controlled evolution until authority explicitly ends it, with finality enforced mechanically, not by convention.

Moreover, an important aspect of the system 2 may be that document mutability may be governed by explicit, authority-controlled state transitions, rather than continuous editability or static immutability. Specifically, the system 2 may enforce that the digital document 6 may be editable until an authorized party (e.g., the first author 201 in FIG. 4) executes a freeze event, which may be a formal state transition rather than a permission toggle. Authority to freeze, unfreeze, or permanently seal the digital document 6 may be delegated to another party, including multi-party or conditional authority. Freeze and seal events may also be part of the canonical lifecycle of the digital document 6 and may be preserved as authoritative temporal boundaries. Once the digital document 6 is permanently sealed by an authorized party (e.g., the first author 201), its state at that moment may become the definitive authoritative version, while all prior states may remain addressable and inspectable without duplication or branching. Accordingly, in one example at no point may multiple parallel authoritative versions exist. Instead, the system 2 may enforce a single canonical truth at any given time. Therefore, an important aspect of the disclosed concept may be that authority to end mutability and time-bound finality are enforceable primitives of the digital document 6 itself, rather than access control rules, version metadata, or social process.

In terms of how the system 2 functions, in one example, behavior of the digital document 6 may be governed by an explicit finite state machine, rather than by continuous editability or static immutability. Specifically, the system 2 may define and enforce distinct lifecycle states for a document, including but not limited to the malleable state, the fixed state, and the absolute state, each of which have been discussed above. More specifically, the malleable state may also correspond to the digital document 6 being modified, including by multiple participants, subject to authority rules; the fixed state may also correspond to the state of the digital document 6 at a specific time being preserved as an authoritative temporal boundary, with mutability suspended; and the absolute state may also correspond to the state of the digital document 6 being permanently finalized, and mutability being structurally terminated.

Transitions between these states may be formal state transitions (e.g., without limitation, not permission changes or user interface locks), and may be preserved as part of the canonical lifecycle of the digital document 6. In addition, the system 2 may treat document state as temporally addressable rather than versioned. The system 2 may resolve document access requests based on the canonical identity 7 and the time coordinates 23, returning the authoritative document state that existed at that moment, regardless of when the request 62 is made. Historical states may be accessed by temporal reference, not by retrieving stored copies or versions. Additionally, state transitions may be triggered by explicit authority events, rather than by ordinary editing actions.

In particular, freeze or seal transitions may be executed only upon receipt of a valid authority signal (e.g., the authority signal 32), which may be from the authorized cryptographic key 90 or another equivalent authority mechanism. As a result, this may cause the system 2 to close the prior temporal window and enforce immutability of the resulting state. These mechanics may ensure that finality be system-enforced, time-bound, and attributable, rather than socially or procedurally inferred. The system 2 may thus operate as a control system defined by explicit state transitions and temporal resolution, as opposed to a system that merely records changes, tracks versions, or relies on access control.

In one example, the system 2 may not be limited to single-author documents. The disclosed concept thus explicitly contemplates multiple participants interacting with the same digital document 6, while maintaining a single authoritative state at any given time. Critically, participation may be distinct from authority.

This is depicted in FIG. 4, wherein one or more authors 201,202 may be permitted to edit or interact with the digital document 6 concurrently, while the system 2 may enforce that mutability persists only until an authorized authority (e.g., the first author 201) executes a formal state transition (e.g., freeze, seal, or finalization event). Thus, the disclosed concept supports multiple actors interacting with the digital document 6 prior to finalization, supports authority to terminate mutability being explicitly governed and enforced by the system 2, and supports freeze and lock events acting as formal state transitions that end collaborative mutability. Additionally, after finalization, the disclosed concept contemplates that the authoritative state may be immutable, while all prior states may remain addressable and inspectable. The system 2 thus prevents ambiguity by ensuring that collaboration may not persist beyond authorized temporal boundaries. Accordingly, the system 2 may not be considered to be single-user-only, and may be distinguishable from collaborative editing systems that lack enforced finality or authority-based termination of mutability.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality can be separated or combined in blocks differently in various implementations of the disclosure or described with different terminology. These and other variations, modifications, additions, and improvements can fall within the scope of the disclosure as defined in the claims that follow.

What is claimed is:

1. A computer-implemented authority binding system for a digital document, the system comprising:

one or more user devices, each comprising a processor and a memory storing instructions, configured to display a malleable representation of the digital document and to transmit interactions with the digital document over a network;

at least one backend server comprising one or more processors and one or more memories storing instructions that, when executed by the one or more processors, cause the at least one backend server to implement:

a document entity configured to represent the digital document as a single canonical identity that persists across time;

a temporal state model, executed on the at least one backend server and in communication with the document entity over the network, configured to receive the digital document from the document entity, receive a time output from a clock, and bind an authoritative state of the digital document to the time output by incorporating the time output as a first-class enforceable primitive directly into a structural model of the digital document, wherein the authoritative state is a single authoritative state of the digital document at any moment in time;

an authority control layer, executed on the at least one backend server, configured to receive an authority signal from an authorized cryptographic key and to govern the authoritative state of the digital document by a plurality of time-bound lifecycle state transitions;

a lifecycle state machine, executed on the at least one backend server and in communication with the authority control layer, configured to structurally enforce the plurality of time-bound lifecycle state transitions of the digital document, wherein the lifecycle state transitions include transitions between a malleable state in which the digital document is editable by the one or more user devices, a fixed state in which the digital document is preserved at a specific moment in time, and an absolute state in which the digital document is permanently finalized;

a resolution engine, executed on the at least one backend server and in communication with the lifecycle state machine and the temporal state model, configured to close a plurality of temporal windows of mutability of the digital document in response to the authority signal being received from the authorized cryptographic key in order to execute the plurality of time-bound lifecycle state transitions and to record corresponding time coordinates as structural boundaries in the temporal state model; and a temporal query interface, executed on the at least one backend server and in communication with the temporal state model and a storage layer, configured to resolve requests to access the digital document received from the one or more user devices by reference to the canonical identity and the time coordinates generated from the time output when the plurality of temporal windows of mutability have been closed by the resolution engine, wherein the one or more user devices are configured to transmit user interactions and authority signals over the network to the backend server and to receive authoritative document states from the backend server via the temporal query interface, such that the document entity, the temporal state model, the authority control layer, the lifecycle state machine, the resolution engine, and the temporal query interface operate together with the one or more user devices as a unified system that forms a closed control loop to maintain only a single authoritative state of the digital document at any given moment in time, with all historical states remaining addressable via the canonical identity and the time coordinates without binding the authoritative state by any of a number of version numbers of the digital document, wherein the backend server, via the resolution engine and the lifecycle state machine, prevents the one or more user devices from displaying at least one of non-authoritative divergent states, local copies, forks, and continued editable representations of the digital document when the plurality of temporal windows of mutability have been closed, and wherein the system is agnostic to storage such that time and authority are enforceable primitives of the digital document, and such that the one or more user devices are prevented from maintaining mutable representations of the digital document outside of the authority-controlled closed control loop enforced by the backend server.

2. The system of claim 1, wherein the lifecycle state machine is further configured to structurally enforce the plurality of time-bound lifecycle state transitions of the digital document without employing at least one of a permission change mechanism, a user interface lock mechanism, and a workflow label mechanism.

3. The system of claim 2, wherein the lifecycle state machine is further configured to structurally enforce the plurality of time-bound lifecycle state transitions of the digital document without employing each of the permission change mechanism, the user interface lock mechanism, and the workflow label mechanism.

4. The system of claim 1, wherein the resolution engine is further configured to close the plurality of temporal windows of mutability of the digital document responsive to at least one authorized party executing one of the plurality of time-bound lifecycle state transitions of the digital document.

5. The system of claim 1, wherein the resolution engine is further configured to close the plurality of temporal windows of mutability of the digital document without reliance on at least one of an organizational policy, a user agreement, a workflow completion signal, and an interface-based status indicator.

6. The system of claim 5, wherein the resolution engine is further configured to close the plurality of temporal windows of mutability of the digital document without reliance on each of the organizational policy, the user agreement, the workflow completion signal, and the interface-based status indicator.

7. The system of claim 1, wherein the plurality of time-bound lifecycle state transitions are configured to be triggered in the lifecycle state machine independent of an editing action with respect to the digital document.

8. The system of claim 1, wherein the document entity is further configured to represent the digital document as a multi-author digital document.

9. An authority binding computer-implemented method for a digital document, comprising:

receiving, at one or more user devices each comprising a processor and a memory, user interactions with a malleable representation of the digital document and transmitting the interactions over a network to at least one backend server;

at the at least one backend server comprising one or more processors and one or more memories:

representing, by a document entity, a single canonical identity for the digital document that persists across time;

receiving, by a temporal state model in communication with the document entity, the digital document and a time output from a clock, and binding an authoritative state of the digital document to the time output by incorporating the time output as a first-class enforceable primitive directly into a structural model of the digital document, wherein the authoritative state is a single authoritative state of the digital document at any moment in time;

receiving, by an authority control layer, an authority signal from an authorized cryptographic key, and governing the authoritative state of the digital document according to a plurality of time-bound lifecycle state transitions;

structurally enforcing, by a lifecycle state machine in communication with the authority control layer, the plurality of time-bound lifecycle state transitions of the digital document, wherein the lifecycle state transitions include transitions between a malleable state in which the digital document is editable by the one or more user devices, a fixed state in which the digital document is preserved at a specific moment in time, and an absolute state in which the digital document is permanently finalized;

closing, by a resolution engine in communication with the lifecycle state machine and the temporal state model, a plurality of temporal windows of mutability of the digital document in response to the authority signal received from the authorized cryptographic key, thereby executing the plurality of time-bound lifecycle state transitions and recording corresponding time coordinates as structural boundaries in the temporal state model;

resolving, by a temporal query interface in communication with the temporal state model and a storage layer, requests to access the digital document received from the one or more user devices by reference to the canonical identity and the time coordinates generated from the time output when the plurality of temporal windows of mutability have been closed;

transmitting, from the backend server to the one or more user devices via the temporal query interface, authoritative document states; and transmitting, by the one or more user devices, user interactions and authority signals over the network to the backend server and receiving, by the one or more user devices, authoritative document states from the backend server via the temporal query interface, such that the document entity, the temporal state model, the authority control layer, the lifecycle state machine, the resolution engine, and the temporal query interface operate together with the one or more user devices as a unified closed control loop that maintains only a single authoritative state of the digital document at any given moment in time, with all historical states remaining addressable via the canonical identity and the time coordinates without binding the authoritative state by any version numbers of the digital document;

wherein the method prevents the one or more user devices from displaying at least one of non-authoritative divergent states, local copies, forks, and continued editable representations of the digital document when the plurality of temporal windows of mutability have been closed, and wherein the method is agnostic to storage such that time and authority are enforceable primitives of the digital document, and such that the one or more user devices are prevented from maintaining mutable representations of the digital document outside of the authority-controlled closed control loop enforced by the backend server.

10. The method of claim 9, wherein binding the authoritative state is performed without auxiliary data being a governing dimension of the digital document.

11. The method of claim 9, further comprising constantly providing the authoritative state to the digital document after binding the authoritative state with the temporal state model.

12. The method of claim 9, further comprising triggering the plurality of time-bound lifecycle state transitions in the lifecycle state machine independent of an editing action with respect to the digital document.

13. The method of claim 9, wherein representing further comprises representing the digital document as a multi-author digital document having the authoritative state at any moment in time, and wherein the method further comprises:

receiving a plurality of interactions with respect to the digital document from each of a first author and a second author different than the first author; and determining to close the plurality of temporal windows of mutability of the digital document responsive to receiving the authority signal at the authority control layer from the first author and not close the plurality of temporal windows of mutability of the digital document responsive to receiving another signal at the authority control layer from the second author because the first author is an authorized authority and the second author is not.

14. The method of claim 9, wherein structurally enforcing is performed without employing at least one of a permission change mechanism, a user interface lock mechanism, and a workflow label mechanism.

15. The method of claim 14, wherein structurally enforcing is performed without employing each of the permission change mechanism, the user interface lock mechanism, and the workflow label mechanism.

16. The method of claim 9, wherein closing is performed without reliance on at least one of an organizational policy, a user agreement, a workflow completion signal, and an interface-based status indicator.

17. The method of claim 16, wherein closing is performed without reliance on each of the organizational policy, the user agreement, the workflow completion signal, and the interface-based status indicator.

* * * * *